(12) United States Patent
Ho et al.

(10) Patent No.: US 12,455,884 B2
(45) Date of Patent: Oct. 28, 2025

(54) EXECUTION TRACING FOR NODE CLUSTER

(71) Applicant: Salesforce, Inc., San Francisco, CA (US)

(72) Inventors: Shao-Yuan Ho, San Jose, CA (US); Atul Jha, Fremont, CA (US); Mark Mears, Oakland, CA (US); Thomas Fanghaenel, Oakland, CA (US)

(73) Assignee: Salesforce, Inc., San Francisco, CA (US)

( * ) Notice: Subject to any disclaimer, the term of this patent is extended or adjusted under 35 U.S.C. 154(b) by 291 days.

(21) Appl. No.: 18/162,371

(22) Filed: Jan. 31, 2023

(65) Prior Publication Data

US 2024/0256551 A1 Aug. 1, 2024

(51) Int. Cl.
*G06F 7/00* (2006.01)
*G06F 16/2455* (2019.01)

(52) U.S. Cl.
CPC .............. *G06F 16/24561* (2019.01)

(58) Field of Classification Search
CPC .................................................. G06F 16/2455
See application file for complete search history.

(56) References Cited

U.S. PATENT DOCUMENTS

| | | | |
|---|---|---|---|
| 6,560,776 B1 * | 5/2003 | Breggin | G06F 8/61 707/999.203 |
| 7,664,798 B2 * | 2/2010 | Wood | G06F 16/21 702/182 |
| 8,335,767 B2 * | 12/2012 | Das | G06F 16/24545 707/661 |
| 8,341,178 B2 * | 12/2012 | Belknap | G06F 11/3476 707/769 |
| 10,241,896 B2 | 3/2019 | Martin | |
| 10,621,071 B2 | 4/2020 | Martin | |

(Continued)

FOREIGN PATENT DOCUMENTS

| | | |
|---|---|---|
| AU | 2018290745 B2 | 12/2020 |
| EP | 3814927 A1 | 5/2021 |

(Continued)

*Primary Examiner* — Mohammed R Uddin
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed that pertain to tracing performance information. A computer system receives a request from a second computer system to perform operations pertaining to a database statement of a database transaction that is being executed by the second computer system. The computer system determines that the request is an initial request received by the computer system to perform work of that database statement. Based on the determining, the computer system stores, in association with the database statement, baseline information that is indicative of a baseline state of one or more performance metrics. Subsequent to performing the operations, the computer system receives a request from the second computer system for performance information. The computer system derives the performance information from a difference between the current state of the one or more performance metrics and the baseline state. The computer system sends the performance information to the second computer system.

20 Claims, 9 Drawing Sheets

(56) References Cited

U.S. PATENT DOCUMENTS

| | | | |
|---|---|---|---|
| 10,691,693 B2 | 6/2020 | Fanghaenel | |
| 10,691,696 B2 | 6/2020 | Helland | |
| 10,901,861 B2 | 1/2021 | Martin | |
| 11,321,294 B2 | 5/2022 | Agrawal | |
| 11,386,065 B2 | 7/2022 | Fanghaenel | |
| 11,537,569 B2 | 12/2022 | Agrawal | |
| 11,789,804 B1 * | 10/2023 | Danyi | G06F 11/079 |
| | | | 714/38.1 |
| 12,189,603 B2 * | 1/2025 | Hong | G06F 16/23 |
| 2008/0021883 A1 * | 1/2008 | Alstrin | H04L 43/0817 |
| 2010/0005340 A1 * | 1/2010 | Belknap | G06F 11/3688 |
| | | | 714/37 |
| 2020/0073987 A1 * | 3/2020 | Perumala | G06F 16/24545 |
| 2020/0097558 A1 | 3/2020 | Fanghaenel | |
| 2020/0097581 A1 | 3/2020 | Chong | |
| 2020/0097583 A1 | 3/2020 | Fanghaenel | |
| 2021/0133186 A1 * | 5/2021 | Jalali | G06F 21/6218 |
| 2022/0067004 A1 | 3/2022 | Agrawal | |
| 2022/0129428 A1 | 4/2022 | Agrawal | |
| 2022/0129433 A1 | 4/2022 | Agrawal | |
| 2022/0138175 A1 | 5/2022 | Mahendra Kumar | |
| 2022/0245113 A1 | 8/2022 | Agrawal | |
| 2023/0308470 A1 * | 9/2023 | Kulshreshtha | H04L 63/20 |

FOREIGN PATENT DOCUMENTS

| | | | |
|---|---|---|---|
| EP | 3814928 A1 | 5/2021 | |
| EP | 3814968 A1 | 5/2021 | |
| EP | 3864518 A1 | 8/2021 | |
| EP | 3991056 A1 | 5/2022 | |

* cited by examiner

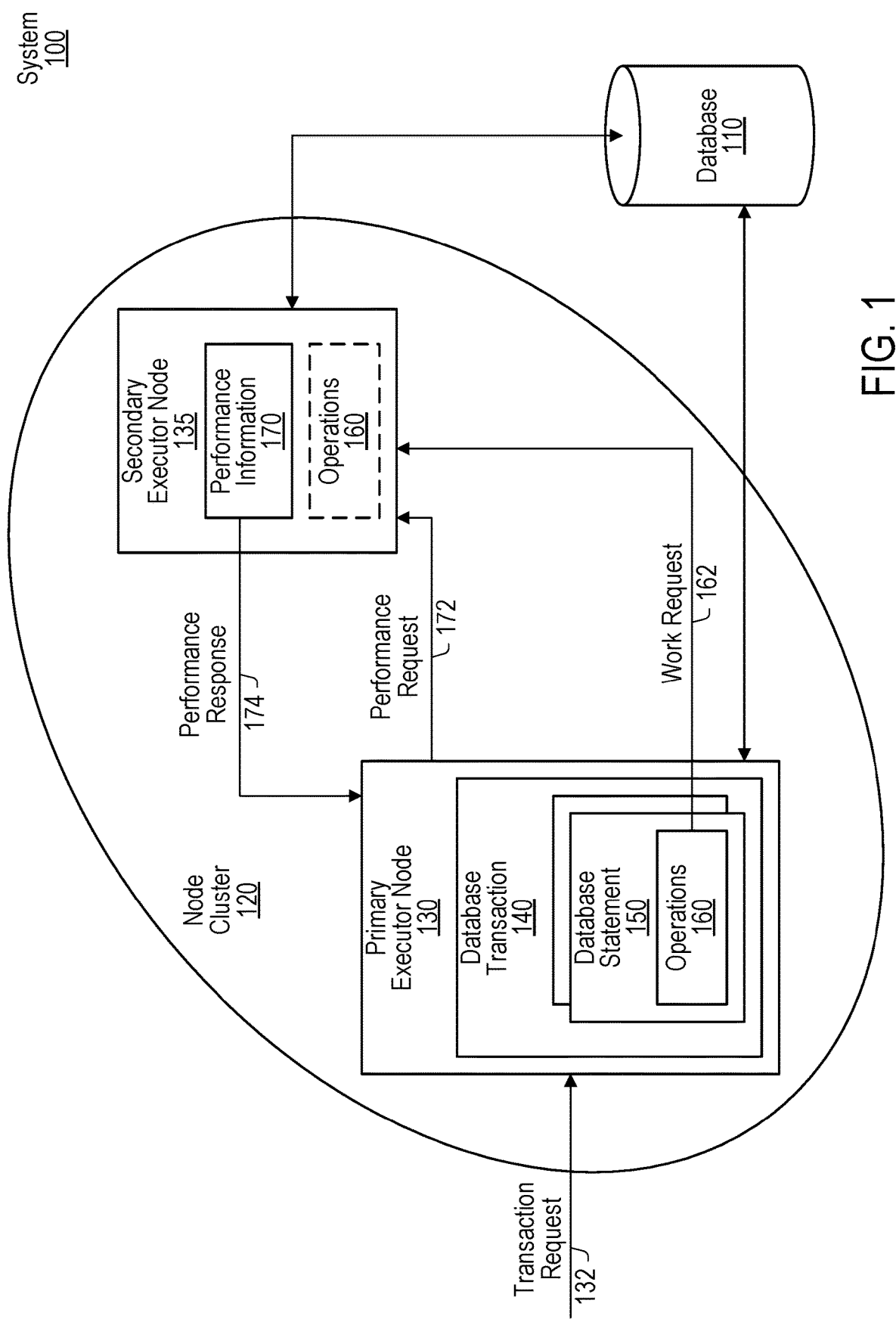

EXECUTION TRACING FOR NODE CLUSTER

BACKGROUND

Technical Field

This disclosure relates generally to computer systems and, more specifically, to various mechanisms for tracing execution information relating to executor nodes that participate in the execution of a database transaction.

Description of the Related Art

Enterprises routinely implement database management systems (or, simply "database systems") that enable users to store a collection of information in an organized manner that can be efficiently accessed and manipulated. A database system can implement any of a variety of different types of databases to store information, such as a relational database, a non-relational database, etc. During operation, a database system receives requests from users via applications or from other systems, such as other database systems, to perform database transactions on the information of a database of that database system. A database transaction can comprise various database statements that define operations (e.g., INSERT, SELECT, etc.) that involve reading information out from the database and/or writing information to the database. For example, the database system may execute a SQL INSERT database statement to insert a record into a table of the database.

BRIEF DESCRIPTION OF THE DRAWINGS

FIG. 1 is a block diagram that illustrates example elements of a system having a database and a node cluster that comprises nodes capable of executing database transactions associated with the database, according to some embodiments.

DETAILED DESCRIPTION

Figure 2A:
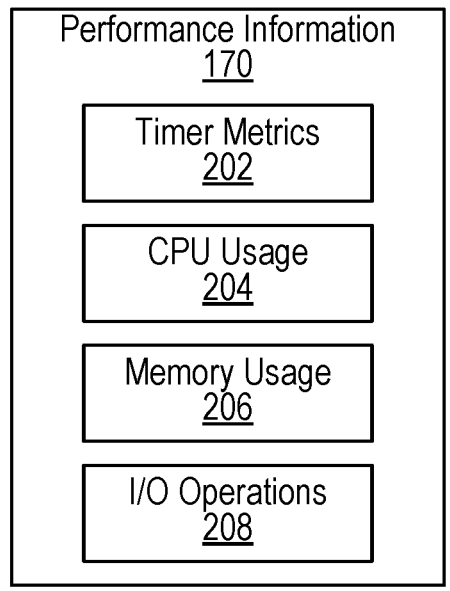
FIG. 2A is a block diagram that illustrates example performance information, according to some embodiments.

Processing database transactions can involve executing various database statements. In some cases, the execution of a database statement takes longer than a threshold amount of time (e.g., 50 milliseconds). For example, a database statement might involve accessing data over a network connection to a storage repository. If that network connection fails, then the execution time of that database statement is likely to exceed, e.g., 50 milliseconds. It can be desirable to diagnose why a database statement exceeded the time threshold. In order to assist in diagnosing the delay, in various embodiments, an executor node that is executing the troublesome database statement can track various performance information, such as the time spent on I/O operations, memory usage, etc. That performance information can be reviewed by a user or another system to determine the cause of the slow execution time so that subsequent executions of the database statement can be made more efficient.

In pursuit of scalability, some database systems are being built based on a write-scaling model in which more than one executor node of a node cluster can be involved in the execution of a database transaction. For example, a first executor node may execute a database transaction having a database statement whose execution involves communicating with a second executor node to access records from that second executor node. In some cases, the execution time of a database statement executed with the assistance of another executor node exceeds the threshold amount of time and thus it may be desirable to diagnose the cause. But conventional approaches do not provide mechanisms for tracking performance metrics at the secondary executor node(s) that assist a primary executor node in the execution of a database transaction. (As used herein, the phrase "primary executor node" refers to the executor node at which a database transaction originates and the phrase "secondary executor node" refers to an executor node that assists in the execution of at least a portion of the database transaction.) The present disclosure addresses, among other things, the technical problem of how to track performance information relating to the secondary executor nodes that participate in the execution of a database transaction so that greater visibility into what happens at those nodes can be obtained.

In various embodiments described below, a system comprises a node cluster having at least a primary executor node and a secondary executor node. The primary executor node may receive a request to execute a database transaction comprising a set of database statements, at least one of which involves communicating with the secondary executor node to perform one or more operations. The primary executor node sends a request to the secondary executor node to perform the one or more operations associated with the particular database statement. The secondary executor node, in various embodiments, determines whether the request is the initial request received from the primary executor node to perform work of the database statement. If the request is the initial request to perform work of the particular database statement, then the secondary executor node stores baseline information in association with the database statement that identifies a baseline state of one or more performance metrics. But if the request is not the initial request, then the secondary executor node performs the one or more operations without first storing baseline information, in various embodiments. After performance of that database statement, the primary executor node may determine that the execution time of that statement exceeded a threshold amount of time. In response to that determination, the primary executor node sends, to the secondary executor node, a request for performance information indicative of the one or more performance metrics. In various embodiments, the secondary executor node derives the performance information from a difference between a current state of those one or more performance metrics and the baseline state. The secondary executor node then returns a response to the primary executor node that includes the performance information.

A database transaction can include a set of database statements that are nested—e.g., a first database statement invokes the execution of a second database statement. In order to track the baseline information for nested statements, in various embodiments, a secondary executor node utilizes a stack-like structure in which each element corresponds to a nested level and is used to store baseline information for the database statement of that nested level. Accordingly, when issuing the initial request to perform work for a database statement, the primary executor node may notify the secondary executor node of the nested level to permit the second executor node to store baseline information for that database statement in the correct level of the stack-like structure.

These techniques may be advantageous over prior approaches as these techniques allow the tracking of performance information relating to secondary executor nodes that participate in the execution of a database transaction. By tracking the performance information, a user or another entity may be able to determine the reasons why particular database transactions whose execution is facilitated by multiple executor nodes exceeded a time threshold. Furthermore, by using a stack-like structure, a secondary executor node can track the performance information of different database statements that are nested. This may allow a user to identify troublesome database statements that may be located several levels down in a nested hierarchy of database statements. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software. In the illustrated embodiment, system 100 includes a database 110 and a node cluster 120 having a primary executor node 130 and a secondary executor node 135. As further shown, primary executor node 130 executes a database transaction 140 that includes a set of database statements 150 (with operations 160), and secondary executor node 135 includes performance information 170. In some embodiments, system 100 is implemented differently than shown—e.g., multiple secondary executor nodes 135 may be assist in the execution of at least a portion of database transaction 140.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases, and entities (e.g., a third-party system) that are associated with system 100. In various embodiments, system 100 is implemented using cloud infrastructure provided by a cloud provider. As such, primary and secondary executor nodes 130 and 135 and database 110 may execute on and use the available cloud resources of the cloud infrastructure (e.g., computing resources, storage resources, etc.) to facilitate their operations. As an example, software for implementing primary executor node 130 might be stored on a non-transitory computer-readable medium of server-based hardware included in a datacenter of the cloud provider and executed in a virtual machine hosted on that server-based hardware. In some instances, primary executor node 130 is implemented without the assistance of a virtual machine or other deployment technologies, such as containerization. In some embodiments, system 100 is implemented utilizing a local or private infrastructure as opposed to a public cloud.

Database 110, in various embodiments, is a collection of information that is organized in a manner that allows for access, storage, and/or manipulation of that information. Database 110 may include supporting software (e.g., storage servers) that enable primary and secondary executor nodes 130 and 135 to carry out those operations (e.g., accessing, storing, etc.) on the information at database 110. In some embodiments, database 110 is implemented using a single or multiple storage devices that are connected together on a network (e.g., a storage attached network (SAN)) and configured to redundantly store information in order to prevent data loss. The storage devices may store data persistently and thus database 110 may serve as a persistent storage for system 100. In various embodiments, data written to database 110 by one executor node 130 or 135 is accessible to other one executor node 130 or 135.

Data may be stored in database records that are a part of database objects (e.g., database tables, indexes, etc.) of database 110. A database record may be a key-value pair that comprises data and a corresponding key usable to look up that database record. For example, a database record may correspond to a data row in a database table, where that database record specifies values for one or more attributes associated with the database table. In various embodiments, database records can also be stored temporarily at primary and secondary executor nodes 130 and 135 before they are persisted to storage devices of database 110.

Primary and secondary executor nodes 130 and 135, in various embodiments, provide database services (e.g., data storage and data retrieval). In some embodiments, executor nodes 130 and 135 are software (e.g., database applications) that is executable on hardware, while in some embodiments, they encompass both the hardware and the software. The database services may be provided to other components within system 100 or to components external to system 100. For example, primary executor node 130 may receive a transaction request 132 from an application node (not depicted) to perform database transaction 140. Database transaction 140, in various embodiments, is a logical unit of work (e.g., a set of database statements 150) to be performed in relation to database 110. For example, processing database transaction 140 may include executing a SQL SELECT database statement 150 to select one or more rows from one or more tables. The contents of a row may be specified in a record and thus primary executor node 130 (or secondary executor node 135) may return one or more data records corresponding to those one or more rows. Performing database transaction 140 can include writing records to database 110. In various embodiments, executor nodes 130 and 135 initially write records to a local, respective in-memory cache before later flushing them to database 110 after they have been committed.

As depicted, a database statement 150 can include a set of operations 160. An operation 160 may correspond to any of variety of work tasks. For example, an operation 160 may be an access operation in which a record that corresponds to the latest version of an underlying data structure (e.g., a row of a table) is accessed. In some instances, that record may exist in the in-memory cache of secondary executor node 135 and thus primary executor node 130 may issue a work request 162 to secondary executor node 135 to execute the access operation and return the requested record. As another example, an operation 160 may be a create or update operation that involves creating a new data structure (e.g., an index) or writing new records into database 110. Operations 160 can include other database work, such as merging files of a log-structured merge tree, releasing locks on records, processing transaction logs, etc. If a database statement 150 includes operations 160 that involve secondary executor node 135, then primary executor node 130 issues one or more work requests 162 to secondary executor node 135 to perform the work. A work request 162 may take the form a remote procedure call (RPC), which allows one program to request a service from a program located on another computer system.

In response to receiving a work request 162 to perform operations 160 for a database statement 150, in various embodiments, secondary executor node 135 determines whether the work request 162 is the first request received to perform work for that database statement 150. If the work request 162 is the first received request, then secondary executor node 135 begins tracking various performance metrics. (Examples of the performance metrics are discussed in greater detail with respect to FIG. 2A.) Secondary executor node 135 performs the requested operations 160 and may return a work response that indicates a result. If the execution time of the database statement 150 exceeds a time threshold, then primary executor node 130 issues a performance request 172 to secondary executor node 135, in various embodiments. Secondary executor node 135 may then derive performance information 170 for that database statement 150 based on its tracking of the various performance metrics. (An example process of deriving performance information 170 is discussed in greater detail with respect to FIG. 3.) Secondary executor node 135 returns that performance information 170 in a performance response 174 to primary executor node 130.

While primary executor node 130 is depicted in FIG. 1 as receiving a transaction request 132, secondary executor node 135 can receive a transaction request 132 to perform a particular database transaction 140. That database transaction 140 may involve secondary executor node 135 communicating with primary executor node 130 to perform a set of operations 160. In that case, the illustrated secondary executor node 135 serves as the primary executor node and the illustrated primary executor node 130 serves as a secondary executor node. Thus, the illustrated secondary executor node 135 might request performance information 170 from the illustrated primary executor node 130.

Turning now to FIG. 2A, a block diagram of example metrics included in performance information 170 is shown. As illustrated, performance information 170 specifies timer metrics 202, CPU usage 204, memory usage 206, and I/O operations 208. The illustrated embodiment may be implemented differently than shown. For example, performance information 170 may specify additional metrics, such as network usage.

As discussed, secondary executor node 135 can track various performance metrics that pertain to its execution of at least a portion of a database statement 150. In response to receiving the initial work request 162 to perform work of a database statement 150, secondary executor node 135 may start a timer to track the time that it takes to perform the requested work. When secondary executor node 135 performs an individual operation 160, it may also start a timer to track the time that it takes to perform that operation 160. The results of the different timers can be included in performance information 170 under timer metrics 202. Secondary executor node 135, in various embodiments, tracks information related to the CPUs of its system, such as the number of cores involved in the execution of an operation 160, the usage percentage of those cores, etc. That information can be included in performance information 170 under CPU usage 204.

In various embodiments, secondary executor node 135 can track the memory usage that is involved in the execution of an operation 160 (e.g., the memory allocated for the operation) and include that information in performance information 170 under memory usage 206. Also, secondary executor node 135 may track the I/O operations that it performs. For example, if an operation 160 involves accessing data from disk, then secondary executor node 135 may store information identifying the I/O read and the time that it took to read the data. That information can be included in performance information 170 under I/O operations 208. As discussed with respect to FIG. 2B, secondary executor node 135 can store baseline information indicative of a baseline state of one or more of the metrics discussed above and use that baseline state to derive performance information 170.

Figure 2B:
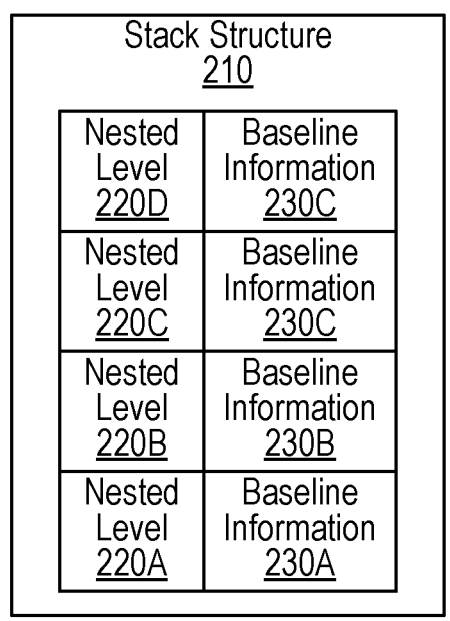
FIG. 2B is a block diagram that illustrates an example stack structure capable of storing baseline information for different nested levels of a set of database statements, according to some embodiments.

Turning now to FIG. 2B, a block diagram of an example stack structure 210 capable of storing baseline information 230 for different nested levels 220 of a set of database statements 150 is depicted. In the illustrated embodiment, stack structure 210 stores baseline information 230A-B in association with nested levels 220A-B, respectively, and baseline information 230C in association with nested levels 220C-D. In some embodiments, an array structure is used in place of stack structure 210.

Baseline information 230, in various embodiments, identifies a baseline state of one or more performance metrics (e.g., timer metrics 202, CPU usage 204, etc.) at a particular point in time. When secondary executor node 135 decides to track those performance metrics, it may take a snapshot of a current state of them and store that snapshot as a baseline for the associated database statement 150. As an example, secondary executor node 135 may record the current memory usage and CPU usage at the time that the first/initial work request 162 is received for a database statement 150. Secondary executor node 135 may start a timer and record the timer's identifier in the appropriate baseline information 230, so that it can be accessed at a later time (e.g., when a performance request 172 is received). Secondary executor node 135 may further add information about other timers to the appropriate baseline information 230 as those timers are started (e.g., when a timer is started to track the execution time of an operation 160).

In various cases, secondary executor node 135 may track baseline information 230 for multiple database statements 150. For example, as discussed, a set of database statements 150 may form a hierarchy in which a database statement 150 is nested within one or more database statements 150. As such, in various embodiments, secondary executor node 135 tracks baseline information 230 for each nested level 220 of the hierarchy. To enable secondary executor node 135 to know the nested level 220 of a database statement 150, primary executor node 130 may track the nested level 220 of each database statement 150 and include an indication of a given statement's nested level 220 in a work request 162 that is sent to secondary executor node 135 to perform work of that given database statement 150.

Stack structure 210, in various embodiments, is a data structure that permits secondary executor node 135 to push entries onto the "top" of the data structure and "pop" entries of the top of the data structure. Accordingly, when the first work request 162 for a database statement 150 is received for a nested level 220 (e.g., nested level 220A), secondary executor node 135 pushes an entry onto the top of stack structure 210 that includes baseline information 230 (e.g., baseline information 230A) for the database statement 150. If the first work request 162 for a lower nested level 220 (e.g., nested level 220B) is received, then secondary executor node 135 pushes an entry onto the top of stack structure 210 that includes baseline information 230 (e.g., baseline information 230B) for the appropriate database statement 150. In some cases, the first work request 162 for a database statement 150 of a certain nested level (e.g., nested level 220C) corresponds to the first work request 162 issued for a database statement 150 of a lower nested level (e.g., nested level 220D). Thus, secondary executor node 135 may push entries for those nested levels 220 onto the top of stack structure 210 that include the same baseline information 230 (e.g., baseline information 230C). An example is discussed in more detail with respect to FIG. 4. When secondary executor node 135 receives a performance request 172 for a particular nested level 220, in various embodiments, secondary executor node 135 accesses the entry for the particular nested level 220 and then uses the baseline information 230 of that entry to derive performance information 170 for the appropriate database statement 150.

Figure 3:
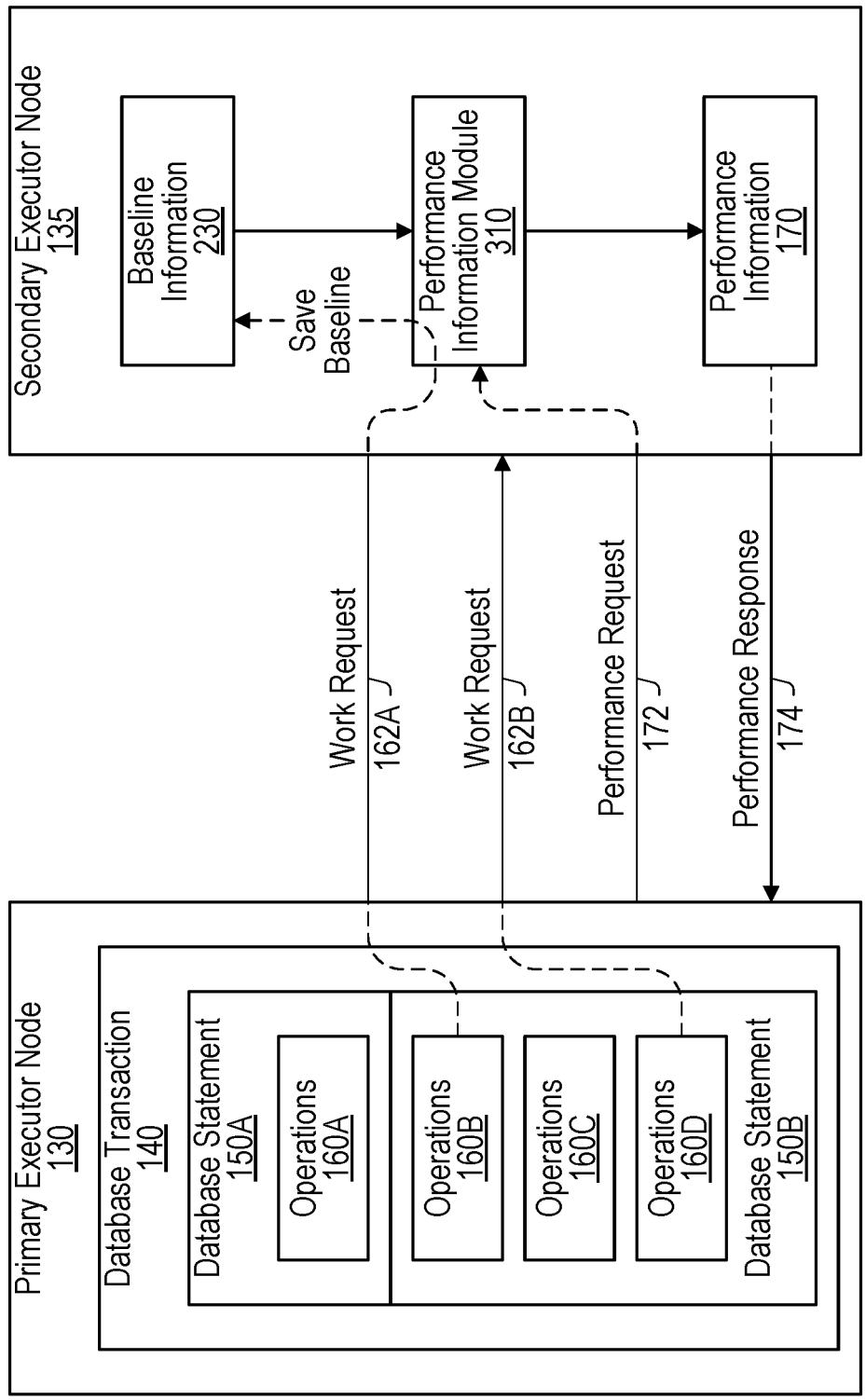
FIG. 3 is a block diagram that illustrates an example process for providing performance information for a non-nested database statement, according to some embodiments.

Turning now to FIG. 3, a block diagram of an example process of creating and providing performance information 170 for a non-nested database statement 150 is shown. As shown in FIG. 3, there is primary executor node 130 and secondary executor node 135. As further shown, primary executor node 130 executes a database transaction 140 having two database statements 150A and 150B. Database statement 150A includes operations 160A, and database statement 150B includes operations 160B-D. As shown, secondary executor node 135 includes baseline information 230, a performance information module 310, and performance information 170. The illustrated embodiment may be implemented differently than shown—e.g., database statements 150A and 150B may be nested.

In various cases, the execution of a database statement 150 does not involve secondary executor nodes 135. As shown for example, database statement 150A does not involve issuing a work request 162 to secondary executor node 135 but instead is solely executed by primary executor node 130—i.e., primary executor node 130 executes operations 160A. After database statement 150A has been executed, primary executor node 130 can proceed to execute the next database statement 150 (i.e., database statement 150B). In the illustrated embodiment, database statement 150B includes operations 160B and 160D that involve secondary executor node 135, while operations 160C are to be executed locally. For operations 160B, primary executor node 130 issues a first work request 162A for database statement 150B to secondary executor node 135, as shown. Work request 162A may include an indication that it is associated with database statement 150B and is the first work request 162 sent for database statement 150B as observed by primary executor node 130.

Performance information module 310, in various embodiments, manages the tracing of performance information 170, including the creation of baseline information 230 for different database statements 150 and the management of stack structure 210. In response to secondary executor node 135 receiving a work request 162 from primary executor node 130, performance information module 310 determines from the received work request 162 whether it is the first work request 162 received by secondary executor 135 for its corresponding database statement 150. In the case of work request 162A, it is the first work request 162 that is initially received for database statement 150B. In various embodiments, performance information module 310 stores baseline information 230 in response to the first work request 162 that is received for a database statement 150. As shown, the illustrated baseline information 230 is saved in response to receiving work request 162A. As further shown, primary executor node 130 sends a work request 162B in relation to operations 160D. But because work request 162B is not the first work request 162 for database statement 150B, performance information module 310 does not store baseline information 230 in response to work request 162B.

After a database statement 150 have been completed, in various embodiments, primary executor node 130 determines if the execution time of that database statement 150 exceeded a threshold time. If the execution time exceeded the threshold time, then primary executor node 130 issues, to secondary executor node 135, a performance request 172 in association with the appropriate database statement 150. In the illustrated embodiment, primary executor node 130 sends a performance request 172 for database statement 150B. In response to that performance request 172 being received at secondary executor node 135, performance information module 310 accesses the baseline information 230 associated with database statement 150B and uses it to produce performance information 170. In particular, in various embodiments, performance information module 310 takes a snapshot of the current state of the one or more performance metrics that are were used in the baseline information 230 associated with database statement 150B. Performance information module 310 then derives performance information 170 based on a difference between the current state and the baseline state, and/or the current state of the metrics (e.g., the time stored by a particular timer). Secondary executor node 135 then provides performance information 170 in a performance response 174 to primary executor node 130.

Figure 4:
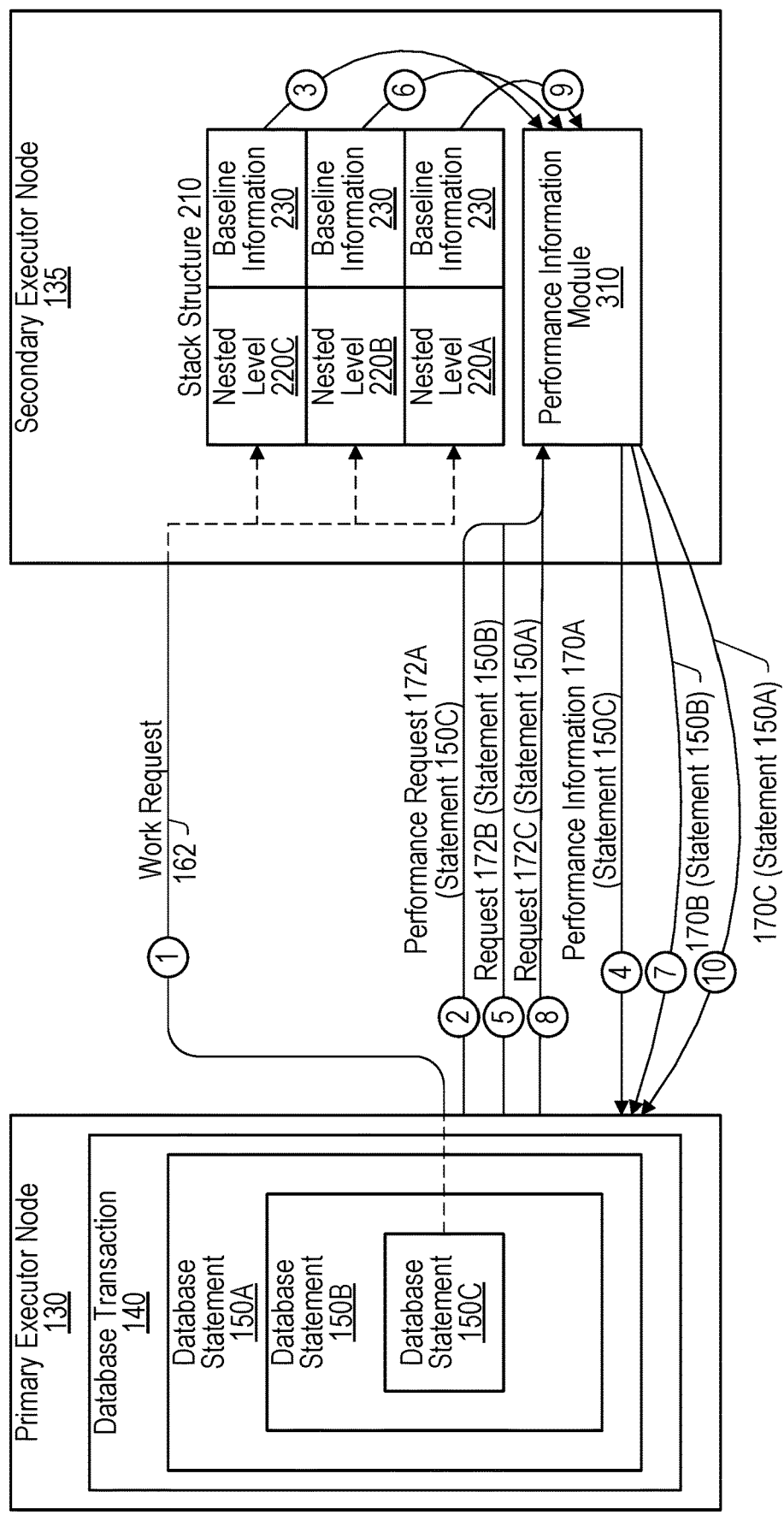
FIG. 4 is a block diagram that illustrates an example process for providing performance information for a nested database statement, according to some embodiments.

Turning now to FIG. 4, a block diagram of an example process of creating and providing performance information 170 for a nested database statement 150 is shown. As shown in FIG. 4, there is primary executor node 130 and secondary executor node 135, and primary executor node 130 executes a database transaction 140 having database statements 150A-C. As further shown, database statement 150C is nested/included in database statement 150B, which is itself nested within database statement 150A. Also as shown, secondary executor node 135 includes performance information module 310 and stack structure 210, which stores the same baseline information 230 in association with nested levels 220A-C. In some instances, the illustrated embodiment may be implemented differently than depicted—e.g., an array structure might be used in place of stack structure 210.

In some cases, a set of database statements 150 form a hierarchy in which the execution of a database statement 150 may involve executing one or more other database statements 150. As depicted, database statements 150A-C form a hierarchy in which the execution of database statement 150A includes executing database statement 150B, and executing database statement 150B includes executing database statement 150C. When executing database statement 150C, primary executor node 130 issues a work request 162 for database statement 150C to secondary executor node 135. That work request 162 may specify nested level 220C (the $2^{nd}$ nested level of the hierarchy, where the $0^{th}$ nested level corresponds to the top level).

In the illustrated embodiment, the work request 162 issued for database statement 150C is also the first work request 162 issued for database statements 150A and 150B. Accordingly, in various embodiments, performance information module 310 stores baseline information 230 for all three database statements 150A-C. In particular, performance information module 310 may observe that the work issued for database statement 150C identifies nested levels 220A-C or only nested level 220C. In the latter case, performance information module 310 may observe that baseline information 230 was not stored for the other nested levels 220A and 220B and thus the work request 162 is also the first work request 162 for those nested levels 220. In either case, performance information module 310 may take a baseline snapshot indicative of a baseline state of one or more performance metrics and store the same baseline state for database statements 150A-C. Consequently, nested levels 220A-C map to the same baseline information 230. In various embodiments, when storing that baseline information 230, performance information module 310 initially pushes an entry for nested level 220A (for database statement 150A) onto stack structure 210, followed by an entry for nested level 220B (for database statement 150C), and then an entry for nested level 220C.

After completion of database statement 150C, for the illustrated embodiment, primary executor node 130 determines that the execution time of database statement 150C exceeded a defined threshold time and thus sends a performance request 172A for database statement 150C to secondary executor node 135. Performance request 172A may specify nested level 220C. In various embodiments, performance information module 310 determines that the top entry of stack structure 210 corresponds to nested level 220C and then derives performance information 170A for database statement 150C from that entry's baseline information 230. Performance information 170A is then sent to primary executor node 130, as shown.

After completion of database statement 150B, for the illustrated embodiment, primary executor node 130 determines that the execution time of database statement 150B exceeded a defined time threshold and thus sends a performance request 172B for database statement 150B to secondary executor node 135. In some embodiments, primary executor node 130 may send a single performance request 172 for multiple, nested database statements 150. As an example, the completion of database statement 150C might also be the completion of database statement 150B, and thus primary executor node 130 may send a single performance request 172 for both database statements 150B-C. In response to receiving performance request 172B, performance information module 310 observes that the current top entry of stack structure 210 corresponds to nested level 220B (as can specified by performance request 172B) and derives performance information 170B for database statement 150B from that entry's baseline information 230. As shown, performance information 170B is then provided back to primary executor node 130.

In various cases, the execution time of a lower nested database statement 150 does not exceed the time threshold while a higher nested database statement 150 does. As an example, database statement 150C may execute in under 50 milliseconds while database statement 150B takes longer than 50 milliseconds. In that event, in response to receiving a performance request 172B, performance information module 310 may observe that the current top entry of stack structure 210 corresponds to nested level 220C, not nested level 220B, and thus check the next entries of data structure 210 until the entry corresponding to nested level 220B is found.

After completion of database statement 150C, for the illustrated embodiment, primary executor node 130 sends a performance request 172C to secondary executor node 135, which utilizes the baseline information 230 of nested level 220A to derive baseline information 230C. Accordingly, in the illustrated embodiment, execution of the hierarchy of database statements 150A-C results in performance information 170 being provided to primary executor node 130 for each database statement of that hierarchy.

While a single database transaction 140 is shown in FIG. 4, primary executor node 130 may simultaneously execute multiple database transactions 140 that involves interacting with one or more secondary executor nodes 135. For each database transaction 140 that secondary executor node 135 performs work, in various embodiments, secondary executor node 135 may spawn a process that performs the work for that database transaction 140 and maintains a stack structure 210 for that database transaction 140. Accordingly, secondary executor node 135 may maintain multiple stack structures 210 for multiple database transactions 140.

The pushing and popping off of entries of stack structure 210 may be performed based on information included in work requests 162. In various embodiments, primary executor node 130 tracks whether a work request 162 should be flagged as the initial work request 162 for a given database statement 150 and the current nested level 220. If primary executor node 130 determines that it is sending an initial work request 162 to secondary executor node 135, then primary executor node 130 may indicate, in that work request 162, 1) which nested level 220 to pop to and/or 2) which nested level 220 to push to. Accordingly, based on that information, in various embodiments, secondary executor node 135 pops a set of entries off and/or pushes a set of entries onto stack structure 210. If a work request 162 is not the first work request 162, then primary executor node 130 may not include that information in the work request 162.

Figure 5:
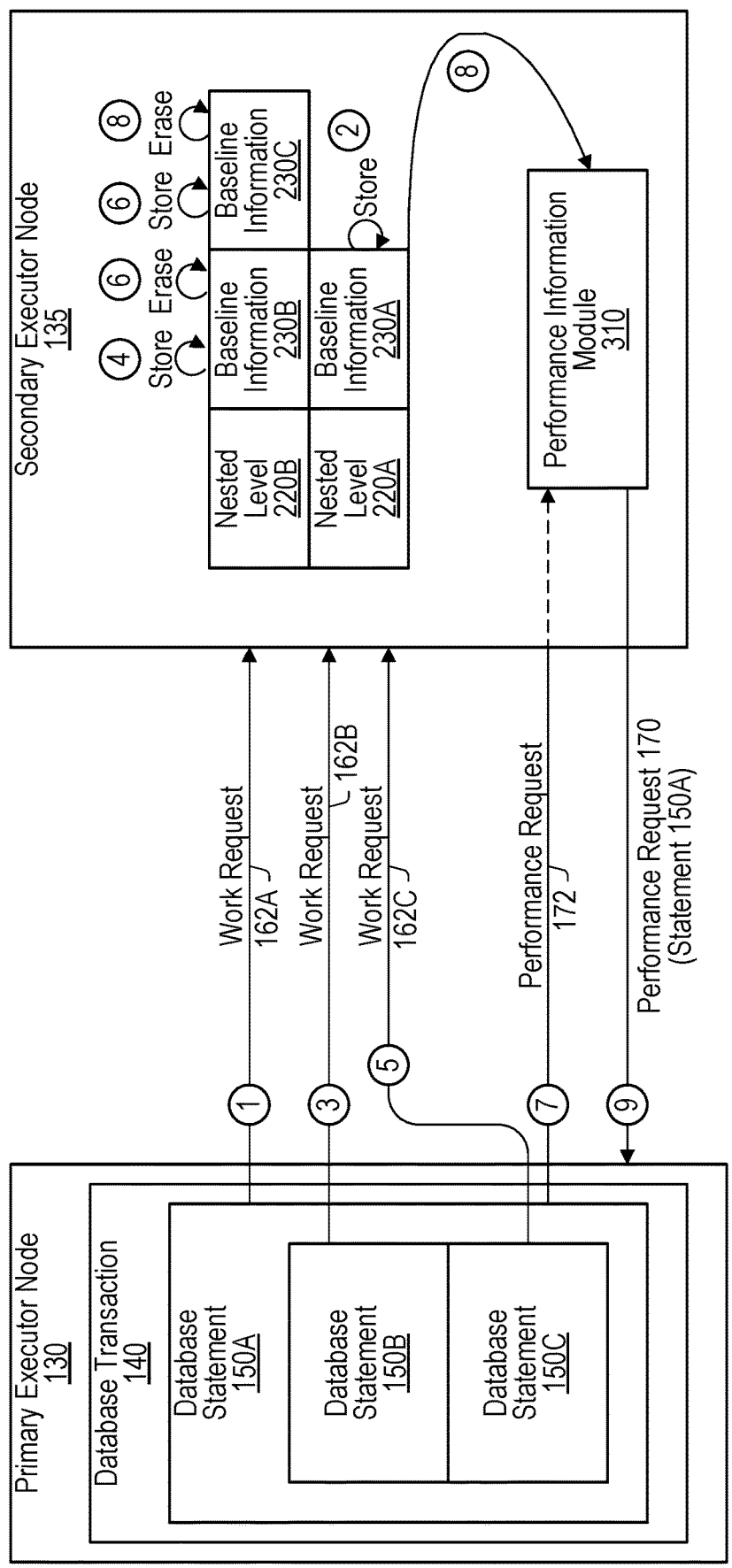
FIG. 5 is a block diagram that illustrates an example process for providing performance information for another nested database statement, according to some embodiments.

Turning now to FIG. 5, a block diagram of an example process of creating and providing performance information 170 for a different nested database statement 150 is shown. As shown in FIG. 5, there is primary executor node 130 and secondary executor node 135. Also as shown, primary executor node 130 implements a database statement 150A that includes two database statements 150B and 150C nested at the same nested level. The illustrated embodiment might be implemented differently than shown. For example, secondary executor node 135 may store baseline information 230 for multiple database statements 150 of the same nested level.

As a part of executing database statement 150A, in the illustrated embodiment, primary executor node 130 sends a work request 162A to secondary executor node 135 to perform work associated with database statement 150A. Work request 162A is the first work request 162 that is associated with database statement 150A and, as a result, secondary executor node 135 stores baseline information 230A for database statement 150A in association with nested level 220A. In the illustrated embodiment, executing database statement 150B also involves issuing a work request 162B to secondary executor node 135. In response to work request 162B being the first work request 162 for database statement 150B, secondary executor node 135 stores, in nested level 220B, baseline information 230B for database statement 150B. Since the issuing of work requests 162A and 162B occurs at different times, the current state of the performance metrics being tracked may be different when those requests arrive at secondary executor node 135. As a result, in some cases, the baseline information 230 between two database statements 150 can be different, even between parent and child database statements 150 (e.g., database statements 150A and 150B).

In some cases, a database statement 150 can comprise multiple database statements 150 that each involve issuing a work request 162. In the illustrated embodiment, executing database statement 150C includes issuing a work request 162C to secondary executor node 135—work request 162C is a second initial/first work request 162 for the nested level. In response to work request 162B being the first work request 162 for database statement 150C, secondary executor node 135 stores, in nested level 220B, baseline information 230C for database statement 150C. But, in various embodiments, secondary executor node 135 overrides the baseline information 230 that was previously stored for that nested level 220 (i.e., baseline information 230B). This may be done as that baseline information 230 may no longer be desired. In particular, primary executor node 130 may determine whether a database statement 150 exceeded a time threshold and send a performance request 172 if applicable before executing another database statement 150 of the same nested level. If secondary executor node 135 receives a first work request 162 for the latter database statement 150, then it may be assumed that the former database statement 150 did not exceed that time threshold and therefore primary executor node 130 will not issue a performance request 172. Consequently, secondary executor node 135 may erase the baseline information 230 for the former database statement 150. Accordingly, secondary executor node 135 erases baseline information 230B in response to receiving work request 162C for database statement 150C, in the illustrated embodiment.

In the illustrated embodiment, after completing execution of database statement 150A, primary executor node 130 issues, to secondary executor node 135, a performance request 172 for database statement 150A. In a similar manner to erasing the baseline information 230 for database statements 150 that are associated with the same particular nested level 220, in various embodiments, secondary executor node 135 may erase the baseline information 230 associated with a lower nested level 220 in response to a performance request 172 associated with a higher nested level 220. As an example, secondary executor node 135 erases the baseline information 230C for database statement 150C in response to the performance request 172 associated with database statement 150A. In some embodiments, secondary executor node 135 may also erase the baseline information 230 associated with one or more lower nested levels 220 in response to a work request 162 associated with a higher nested level 220. As an example, if secondary executor node 135 received a work request 162 for another database statement 150 at the same nested level 220 as database statement 150A, then secondary executor node 135 erases baseline information 230C associated with database statement 150C.

In response to receiving performance request 172, performance information module 310 derives the requested performance information 170 using baseline information 230A and provides it back to primary executor node 130 as shown. In some embodiments, performance information module 310 also derives performance information 170 for lower nested levels 220. Thus, performance information module 310 may also derive performance information 170 for both database statements 150A and 150C using baseline information 230b and 230C, respectively.

Figure 6:
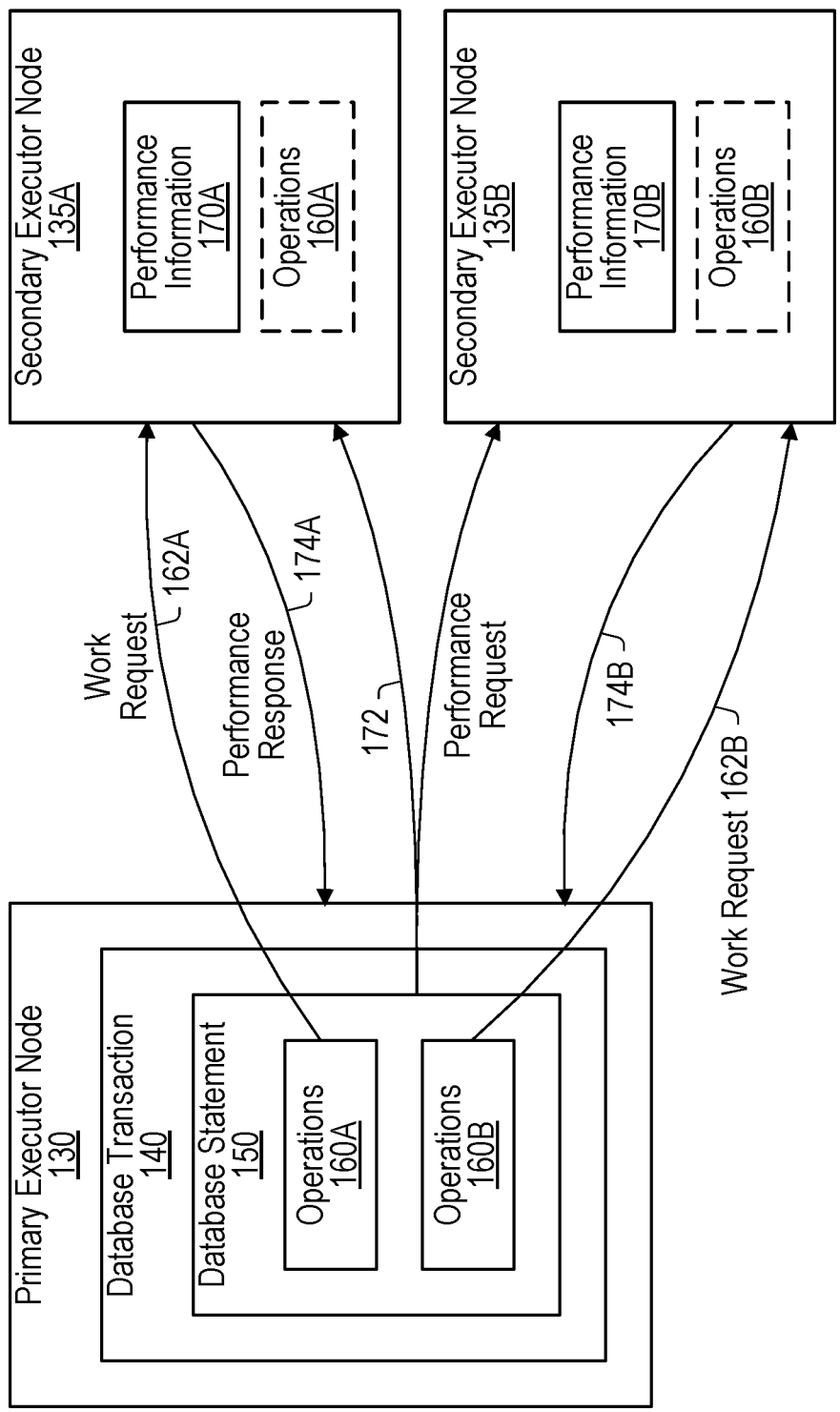
FIG. 6 is a block diagram that illustrates an example process for obtaining performance information from multiple nodes for a database statement, according to some embodiments.

Turning now to FIG. 6, a block diagram of an example process of obtaining performance information 170 from multiple nodes for a database statement 150 is shown. In the illustrated embodiment, there is primary executor node 130 and two secondary executor nodes 135A and 135B. The illustrated embodiment may be implemented differently than shown. For example, multiple secondary executor nodes 135 may be associated with the same operations 160.

In some cases, implementing a database statement 150 may involve multiple secondary executor nodes 135. As shown for example, primary executor node 130 issues a work request 162A to secondary executor node 135A to perform operations 160A of database statement 150 and a work request 162B to secondary executor node 135B to perform operations 160B of the same database statement 150. Because multiple secondary executor nodes 135 are involved in the same database statement 150, in various embodiments, primary executor node 130 gathers performance information 170 from each of those secondary executor nodes 135. Accordingly, in response to determining that the execution time of database statement 150 exceeded a time threshold, primary executor node 130 issues a performance request 172 to secondary executor nodes 135A and 135B. Secondary executor nodes 135A and 135B then generate performance information 170A and 170B, respectively, using corresponding baseline information 230 that is stored at each of the nodes. Performance information 170A and 170B is returned to primary executor node 130 via performance responses 174A and 174B, respectively.

Figure 7:
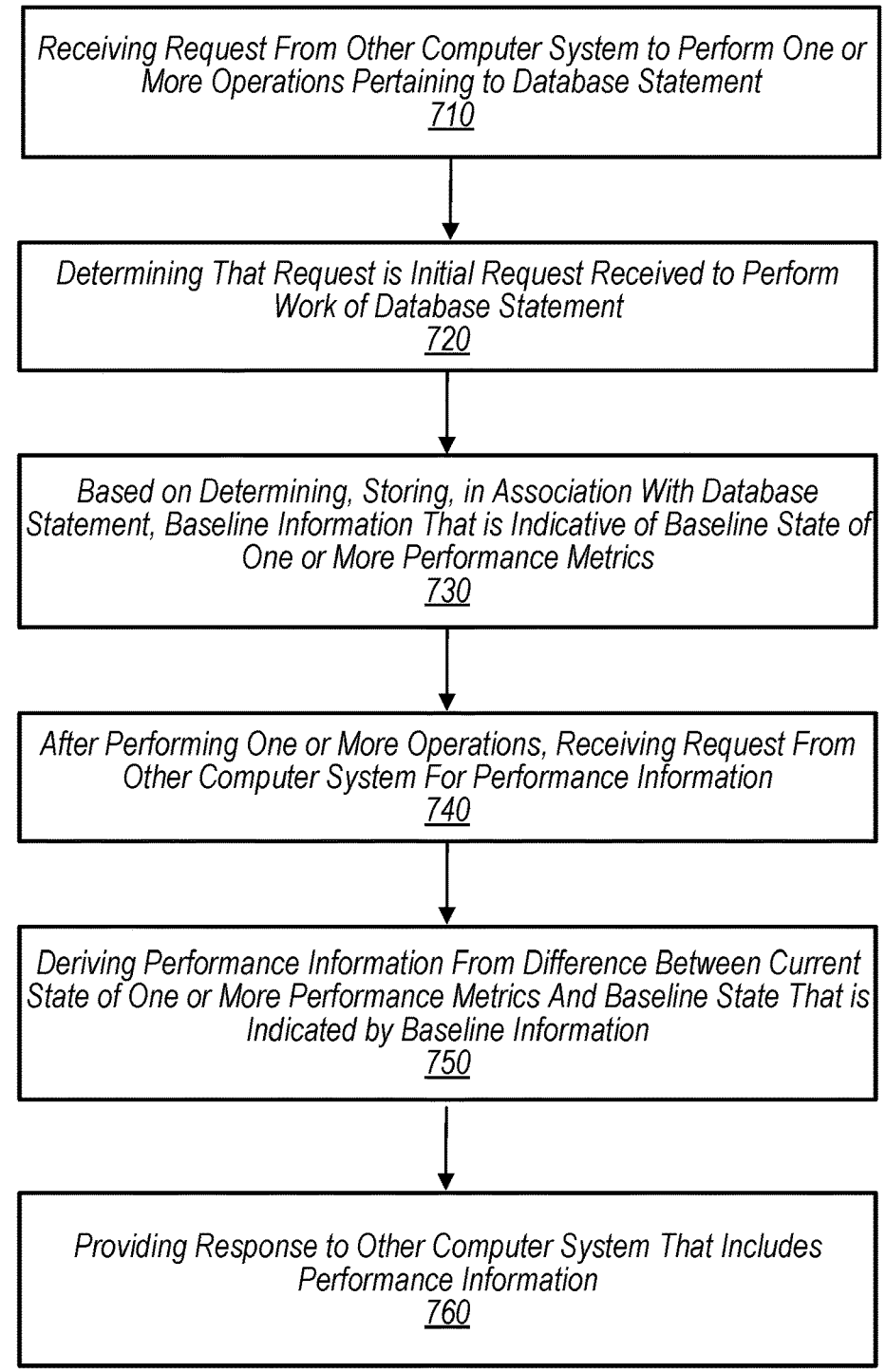
FIGS. 7 and 8 are flow diagrams that illustrate example methods pertaining to obtaining performance information from a computer system participating in the execution of a database transaction, according to some embodiments.

Turning now to FIG. 7, a flow diagram of a method 700 is shown. Method 700 is one embodiment of a method that is performed by a computer system (e.g., a computer system that implements secondary executor node 135) to trace performance information (e.g., performance information 170) at the computer system as part of participating in the execution of a database statement (e.g., database statement 150) of a database transaction (e.g., database transaction 140) being executed by another computer system (e.g., a computer system that implements primary executor node 130). Method 700 may be performed by executing program instructions stored on a non-transitory computer-readable medium. Method 700 may include more or less steps than shown.

Method 700 begins in step 710 with the computer system receiving a request (e.g., a work request 162) from the other computer system to perform one or more operations (e.g., operations 160) that pertain to the database statement. In various embodiments, the computer systems correspond to respective database nodes of a database node cluster (e.g., node cluster 120) that are operable to write data to a database (e.g., database 110). In step 720, the computer system determines that the request is an initial request received by the other computer system to perform work of the database statement. In some cases, the computer system may receive, from the other computer system, a non-work request associated with the database statement prior to the initial request to perform work. That non-work request might trigger the computer system to expect work requests for the database statement.

In step 730, based on the determining, the computer system stores, in association with the database statement, baseline information (e.g., baseline information 230) that is indicative of a baseline state of one or more performance metrics (e.g., timer metrics 202, CPU usage 204, etc.). The performance metrics may include a memory usage metric (e.g., memory usage 206) that specifies a memory usage associated with the computer system. In some cases, the database statement is a first database statement nested within a second database statement of the database transaction. The computer system may also store second baseline information, in association with that second database statement, that is indicative of a second baseline state for the one or more performance metrics. The request to perform work may identify a nested level (e.g., nested level 220) of the first database statement in a nested database statement hierarchy having the first and second statements. In some embodiments, the baseline information of the first database statement is stored in association with its nested level. The request to perform the one or more operations may also be an initial request received by the computer system to perform work of the second database statement. As a result, the first and second baseline states can be the same state for the one or more performance metrics. In some instances, the second baseline information is stored in response to the computer system receiving a different request that is an initial request to perform work of the second database statement and thus the first and second baseline states can be different states for the one or more performance metrics. In some cases, the computer system receives another request to perform a second portion of work of the first database statement. In response to that request not being an initial request to perform without storing a baseline state of the one or more performance metrics.

In some embodiments, the baseline information of the first database statement and the baseline information of the second database statement are stored in a stack structure (e.g., stack structure 210) having a set of levels, each of which corresponds to a respective level of a nested database statement hierarchy having the first and second database statements. In some cases, the computer system receives an initial request to perform work of a database statement that is associated with a particular level of the nested database statement hierarchy. In response, the computer system may purge baseline information stored in the stack structure that is associated with at least one lower level (e.g., nested level 220A) of the nested hierarchy than the particular level (e.g., nested level 220B). In some instances, the computer system may override baseline information that was previously stored for the nested level with the baseline information of the database statement. In response to receiving a request that is an initial request to perform work for a third database statement that is nested within the second database statement at a same level as the first database statement, in various embodiments, the computer system replaces the baseline information of the first database statement with third baseline information associated with the third database statement.

In step 740, after performing the one or more operations, the computer system receives a request (e.g., a performance request 172) from the other computer system for the performance information. In step 750, the computer system then derives the performance information from a difference between a current state of the one or more performance metrics and the baseline state that is indicated by the baseline information associated with the database statement. The request may also include a request for performance information associated with performance of the second database statement. In step 760, the computer system provides a response (e.g., a performance response 174) to the other computer system that includes the performance information.

Figure 8:
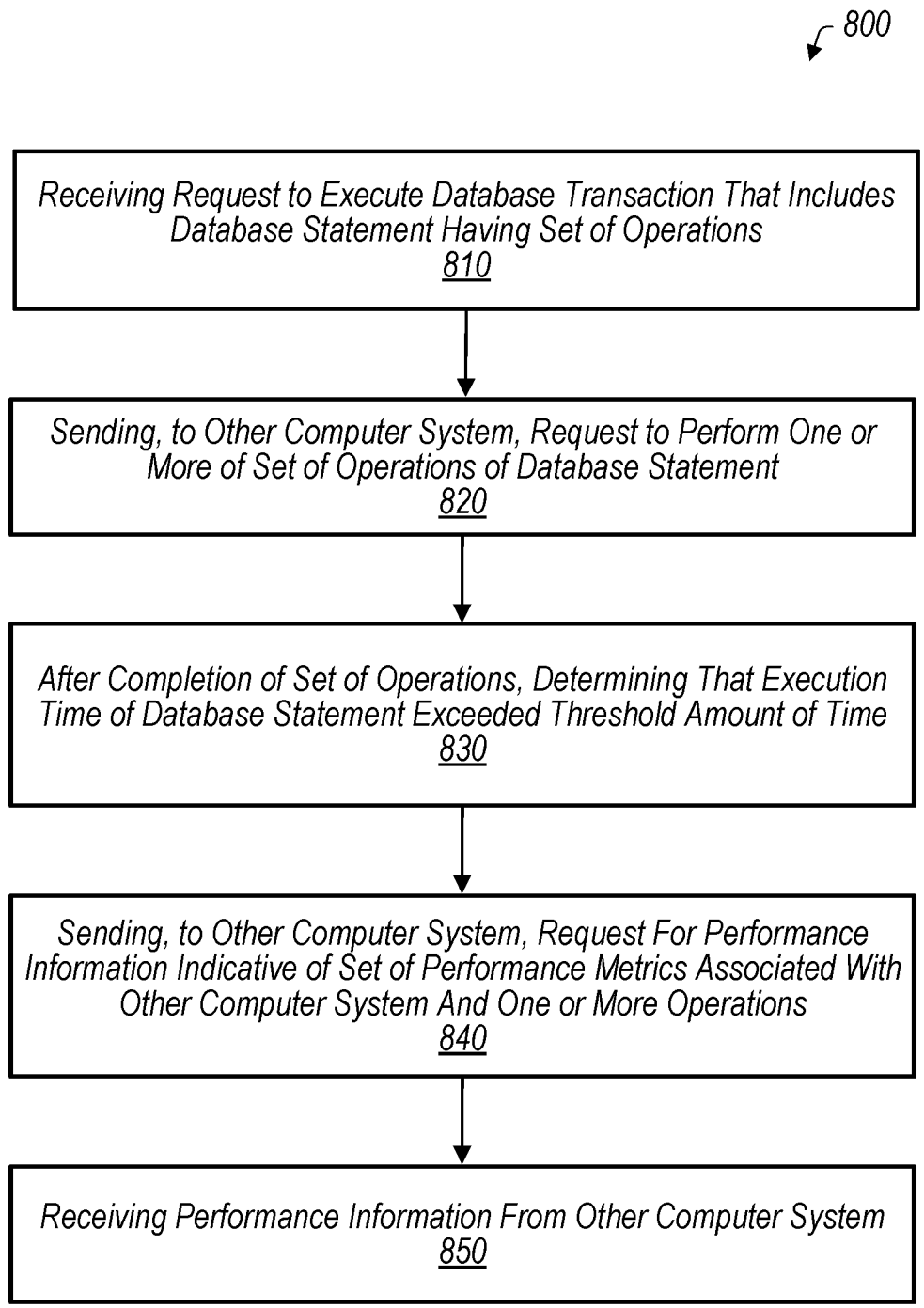

Turning now to FIG. 8, a flow diagram of a method 800 is shown. Method 800 is one embodiment of a method that is performed by a computer system (e.g., a computer system that implements primary executor node 130) to obtain performance information (e.g., performance information 170) from a different computer system (e.g., a computer system that implements secondary executor node 135) that participates in the execution of a database statement (e.g., database statement 150) of a database transaction (e.g., database transaction 140). Method 700 may also be performed by executing program instructions stored on a non-transitory computer-readable medium. Method 700 may include more or less steps than shown.

Method 800 begins in step 810 with the computer system receiving a request (e.g., a transaction request 132) to execute the database transaction having the database statement that includes a set of operations (e.g., operations 160). In step 820, the computer system sends, to the different computer system, a request (e.g., a work request 162) to perform one or more of the set of operations of the database statement. That request may be an initial request sent to the different computer system to perform work of the database statement. In some cases, the database statement is a first database statement that is nested in a set of database statements of the database transaction. Before sending the request to perform work to the different computer system, the computer system determines a nested level of the first database statement and then includes it in the request.

In step 830, after completion of the set of operations, the computer system determines that an execution time of the first database statement exceeded a threshold amount of time. In step 840, the computer system then sends, to the different computer system, a request (e.g., a performance request 172) for performance information indicative of a set of performance metrics associated with the different computer system and the one or more operations that are performed by the different computer system. At least one other computer system may have performed work of the database statement, and the request may be broadcasted to both of the computer systems. In some instances, the request is also a request for performance information indicative of the set of performance metrics for the second database statement. But in some instances, the computer system sends a separate request for performance information indicative of the set of performance metrics for the second database statement. In step 850, the computer system receives the performance information from the different computer system.

Exemplary Computer System

Figure 9:
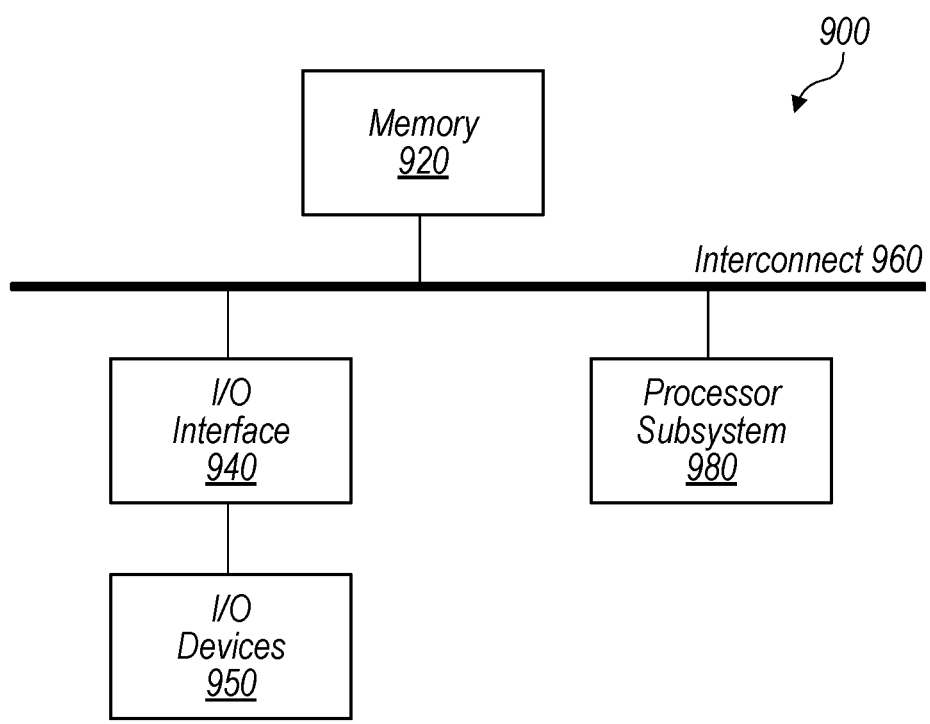
FIG. 9 is a block diagram illustrating elements of a computer system for implementing various systems described in the present disclosure, according to some embodiments.

Turning now to FIG. 9, a block diagram of an exemplary computer system 900, which may implement system 100, primary executor node 130, secondary computer node 135, and/or database 110, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980. In some embodiments, program instructions that when executed can implement primary and/or secondary executor nodes 130 and 135 may be included/stored within system memory 920.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(*f*) during prosecution of a United States patent application based on this disclosure, it will recite claim elements using the "means for" [performing a function] construct.

What is claimed is:

1. A method for tracing performance information at a first executor node that participates in an execution of a first database statement included in a database transaction that is being executed by a second executor node, the method comprising:

receiving, by the first executor node, a first request from the second executor node to perform one or more operations pertaining to the first database statement;

determining, by the first executor node, that the first request is an initial request received by the first executor node to perform work of the first database statement;

based on the determining, the first executor node storing, in association with the first database statement, first baseline information that is indicative of a first baseline state of one or more performance metrics;

after performing the one or more operations, the first executor node receiving a second request from the second executor node for the performance information;

deriving, by the first executor node, the performance information for the first database statement from a difference between a current state of the one or more performance metrics and the first baseline state, wherein the performance information is indicative of a performance of the first executor node in performing the work of the first database statement; and providing, by the first executor node, a response to the second executor node that includes the performance information.

2. The method of claim 1, wherein the first database statement is nested within a second database statement included in the database transaction, and the method further comprising:

storing, by the first executor node, second baseline information, in association with the second database statement, that is indicative of a second baseline state for the one or more performance metrics.

3. The method of claim 2, wherein the first baseline information and the second baseline information are stored in a stack structure having a set of levels, each of which corresponds to a respective level of a nested database statement hierarchy having the first and second database statements.

4. The method of claim 3, further comprising:
receiving, by the first executor node, an initial request to perform work of a database statement associated with a particular level of the nested database statement hierarchy; and
purging, by the first executor node, baseline information stored in the stack structure that is associated with at least one lower level of the nested database statement hierarchy than the particular level.

5. The method of claim 2, wherein the first request identifies a nested level of the first database statement within a nested database statement hierarchy having the first and second database statements, and wherein the first baseline information is stored in association with the nested level of the first database statement.

6. The method of claim 2, further comprising:
in response to receiving a request that is an initial request to perform work for a third database statement that is nested within the second database statement at a same level as the first database statement, the first executor node replacing the first baseline information with third baseline information that is associated with the third database statement.

7. The method of claim 2, wherein the first request is an initial request that is received by the first executor node to perform work of the second database statement, wherein the first and second baseline states are a same state for the one or more performance metrics.

8. The method of claim 2, wherein the second baseline information is stored in response to the first executor node receiving an initial request to perform work of the second database statement, wherein the first and second baseline states are different states for the one or more performance metrics.

9. The method of claim 1, wherein the one or more performance metrics include a memory usage metric that specifies a memory usage associated with the first executor node.

10. The method of claim 1, wherein the first and second executor nodes are part of a database node cluster that is operable to write data to a database.

11. A non-transitory computer readable medium having program instructions stored thereon that are capable of causing a first executor node to perform operations comprising:
receiving, from a second executor node, a first request to perform a first portion of work of a first database statement included in a database transaction that is being executed by the second executor node;
determining that the first request is an initial request received by the first executor node to perform work of the first database statement;
based on the determining, storing, in association with the first database statement, first baseline information that is indicative of a first baseline state of one or more performance metrics of the first executor node;
subsequent to performing the first portion of work, receiving a second request from the second executor node for performance information associated with performance of the first database statement;
deriving the performance information from a difference between a current state of the one or more performance metrics and the first baseline state, wherein the performance information is indicative of a performance of the first executor node in performing the work of the first database statement; and
providing, to the second executor node, the performance information.

12. The non-transitory computer readable medium of claim 11, wherein the first database statement is nested within a second database statement included in the database transaction, and wherein the operations further comprise:
storing second baseline information, in association with the second database statement, that is indicative of a second baseline state for the one or more performance metrics.

13. The non-transitory computer readable medium of claim 12, wherein the second request includes a request for additional performance information that is associated with performance of the second database statement, and wherein the operations further comprise:
deriving the additional performance information from a difference between the current state and the second baseline state.

14. The non-transitory computer readable medium of claim 11, wherein the first request identifies a nested level of the first database statement in a nested database statement hierarchy, and wherein the operations further comprise
overriding baseline information that was previously stored for the nested level with the first baseline information.

15. The non-transitory computer readable medium of claim 11, wherein the operations further comprise:
receiving, from the second executor node, a third request to perform a second portion of work of the first database statement; and
in response to the third request not being an initial request to perform work of the first database statement, performing the second portion of work without storing a baseline state of the one or more performance metrics.

16. A non-transitory computer readable medium having program instructions stored thereon that are capable of causing a first computer system to perform operations comprising:
receiving a first request to execute a database transaction that includes a first database statement having a set of operations;
sending, to a second computer system, a second request to perform one or more of the set of operations of the first database statement, wherein the second request is an initial request sent to the second computer system to perform work of the first database statement;
after completion of the set of operations, determining that an execution time of the first database statement exceeded a threshold amount of time; and
sending, to the second computer system, a third request for performance information indicative of a set of performance metrics associated with the second computer system and the one or more operations performed by the second computer system; and
receiving the performance information from the second computer system.

17. The non-transitory computer readable medium of claim 16, wherein the first database statement is nested in a set of database statements included in the database transaction, wherein the operations further comprise:

before sending the second request to the second computer system, determining a nested level of the first database statement, wherein the second request specifies the nested level.

18. The non-transitory computer readable medium of claim 16, wherein at least one other computer system performed work of the first database statement, and wherein sending the third request includes broadcasting the third request to the second computer system and the at least one other computer system.

19. The non-transitory computer readable medium of claim 16, wherein the first database statement is nested in a second database statement, wherein the third request is a request for performance information indicative of the set of performance metrics for the second database statement.

20. The non-transitory computer readable medium of claim 16, wherein the first database statement is nested in a second database statement, wherein the operations further comprise:

sending, to the second computer system, a fourth request for performance information indicative of the set of performance metrics for the second database statement.

* * * * *